UNITED STATES PATENT OFFICE.

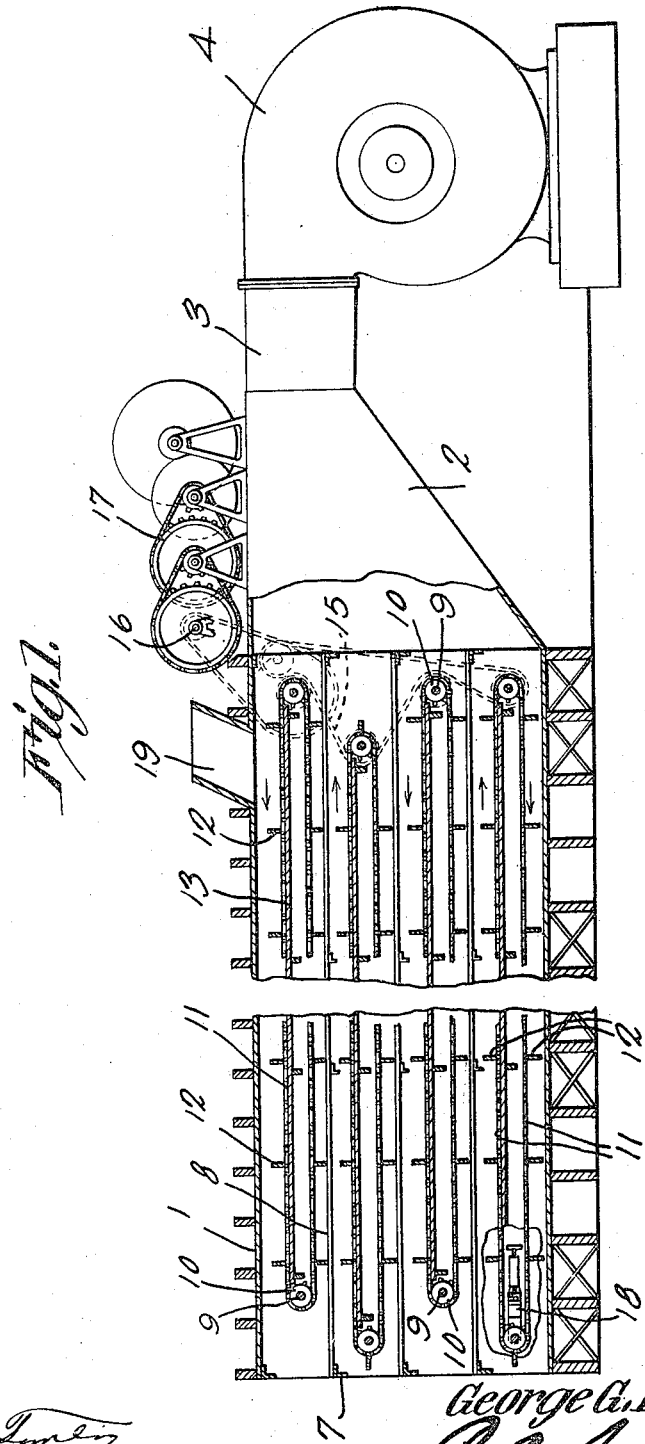

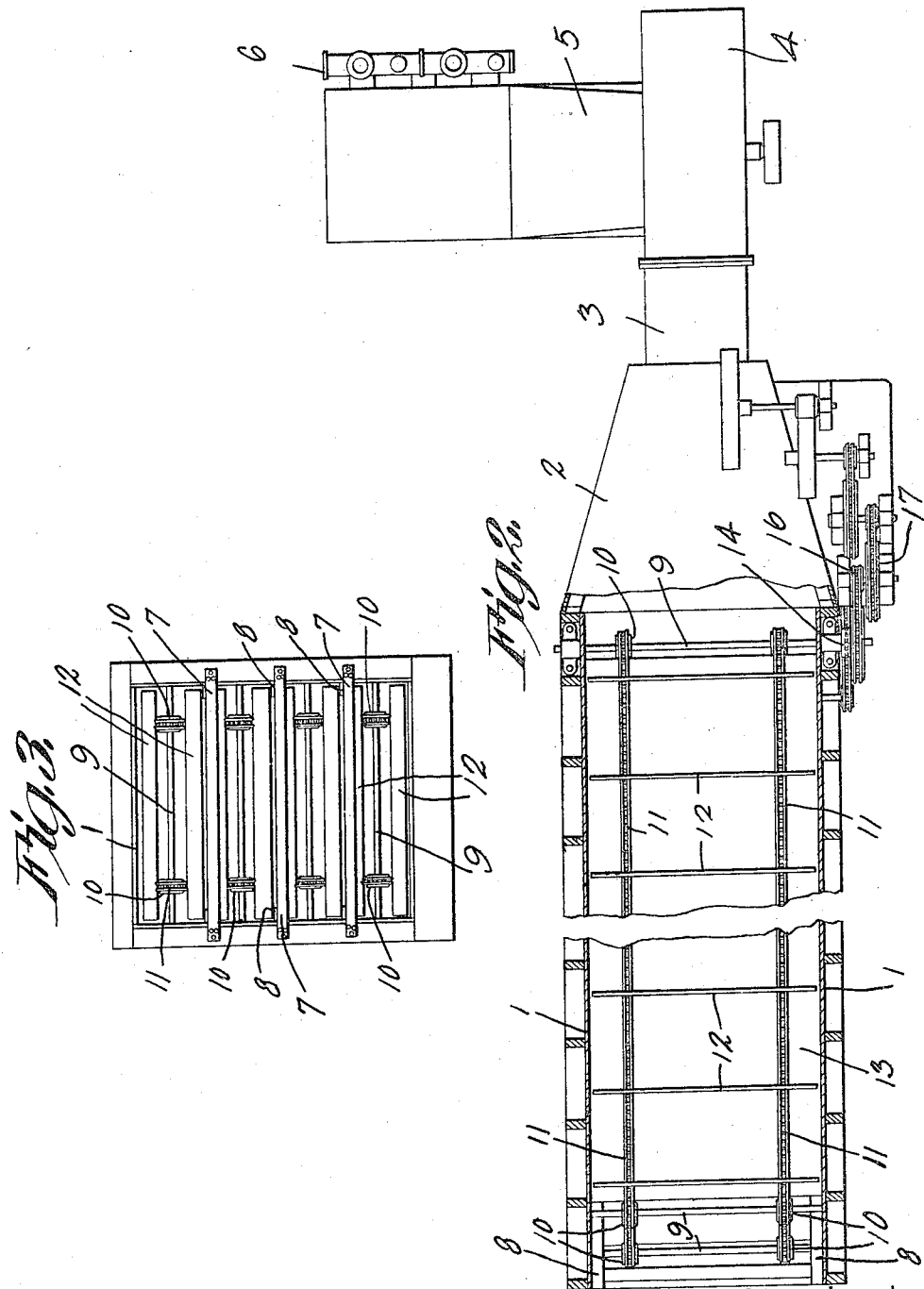

GEORGE G. EGGE, OF MONTGOMERY, ALABAMA, ASSIGNOR OF FIFTY-ONE ONE-HUNDREDTHS TO HIMSELF AND FORTY-NINE ONE-HUNDREDTHS TO J. C. FISCHESSER, OF MONTGOMERY, ALABAMA.

BEAN-DRIER.

1,241,465.	Specification of Letters Patent.	Patented Sept. 25, 1917.

Application filed December 26, 1916. Serial No. 138,880.

*To all whom it may concern:*

Be it known that I, GEORGE G. EGGE, a citizen of the United States, residing at Montgomery, in the county of Montgomery and State of Alabama, have invented a new and useful Bean-Drier, of which the following is a specification.

This invention relates to apparatus for drying beans, one of its objects being to provide means whereby beans after being deposited in the drier will be moved continuously back and forth within a hot air blast, the movement of the beans being gradual and in line with the blast so that when the beans finally issue from the apparatus they will be thoroughly dried.

A still further object is to provide means whereby the moisture driven from the beans will be carried out of the apparatus promptly and thus not retard the drying action.

Another object is to provide apparatus of this character which is simple and compact in construction and will operate efficiently for the purposes intended.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a view partly in side elevation and partly in longitudinal section of the complete apparatus.

Fig. 2 is a view partly in plan and partly in horizontal section.

Fig. 3 is an end elevation.

Referring to the figures by characters of reference 1 designates a housing open at its ends throughout the height thereof and extending throughout the height and width of one end of this housing is the square end 2 of a flue 3 extending from the casing 4 of a blower. This casing has an intake flue 5 in which is located heating apparatus which can, if desired, be made up of steam heated coils 6. Thus when the blower is operated, air will be drawn into the casing 4 by way of the flue 5 in a highly heated condition and will then be discharged through the flue 3 into one end of the housing 1, the flared end of the flue causing the air blast to spread so as to extend throughout the height and width of the interior of the housing.

Secured to the housing are superposed transverse supports 7 which may be made of angle strips or the like and on these supports are mounted longitudinally extending strips 8 constituting tracks. Transverse shafts 9 are journaled in the sides of the housing and are arranged in pairs, one pair being located above each of the sets of guide strips 8. On each of the shafts 9 are secured sprockets 10 and the sprockets on each pair of shafts are engaged by endless chains 11 carrying outstanding cleats 12. The cleats of the lower flight of the conveyer thus produced are adapted to travel along the strips 8 adjacent thereto, while the upper flights of the chains are adapted to travel along a floor 13 which is parallel therewith and arranged between the shafts 9. The superposed conveyers are staggered so that material discharged from one end of the uppermost conveyer will fall upon the floor 13 of the next adjoining conveyer thereunder, this arrangement being followed throughout the height of the apparatus. A sprocket 14 is provided on the outer end of one shaft 9 of each pair and these sprockets 14 are engaged by an endless chain 15 or the like adapted to be driven by a shaft 16 or in any other suitable manner. The chain is so guided that each conveyer is driven oppositely to the next adjoining conveyers as indicated by arrows in Fig. 1. Any suitable means may be employed for driving the shaft 16 and in Figs. 1 and 2 an arrangement of gears and sprockets has been illustrated generally at 17 for this purpose. One or more of the conveyers may be provided with a tightener as indicated at 18, this tightener being of any suitable construction and preferably including an adjustable member in which the adjacent shaft 9 is journaled.

When the various parts of the apparatus are set in motion a blast of hot air will be discharged longitudinally over and between the various conveyers and will leave the housing at that end thereof removed from the flared end 2 of the flue 3. The several conveyers will operate very slowly and the beans to be dried are delivered onto the receiving end of the uppermost floor 13 through a suitable chute, a portion of which has been indicated at 19. When the beans are thus piled on the uppermost floor they are brought into the path of the hot air blast and while being acted on by this blast will be drawn slowly along the floor by the cleats 12 of the uppermost conveyer until they are finally discharged from the end of the conveyer onto the floor 13 of the next adjoining conveyer thereunder. This second conveyer operates in the opposite direction and therefore draws the beans toward the blower 4 and against the hot air blast. When the beans reach the end of the second floor 13 they gravitate onto the third floor where they are engaged by a conveyer moving in the same direction as the uppermost one. This operation is continued throughout the height of the apparatus until the beans are finally delivered from the lowermost conveyer at a point where they can be conveniently reached and removed from the apparatus. The parts are so timed that when the beans reach the discharge end of the lowermost conveyer they will be thoroughly dried.

Importance is attached to the fact that during the drying operation the air blast flows freely from one end to the other of the housing and thus carries off any moisture driven from the beans. Consequently the drying is expedited and the air in the housing is kept dry at all times.

Although the flue 3 has been shown with a flared end 2, it is to be understood that this flue can be made of any other form desired, it merely being necessary that it direct into the apparatus a hot air blast which is coextensive with the height and width of the interior of the housing.

What is claimed is:—

The combination with a housing having open ends, of superposed endless conveyers within the housing, means for driving each conveyer in a direction opposite to the adjoining conveyers, a floor under the upper flight of each conveyer, means for directing material onto one end of the floor of the uppermost conveyer, each conveyer constituting means for discharging material from one end of its floor onto one end of the floor of the next adjoining conveyer, means extending under each conveyer for supporting the lower flight thereof, and means for directing a hot air blast longitudinally of the housing and over and between the conveyers, said blast being coextensive of the height and width of the interior of the housing.

In testimony that I claim the foregoing as my own, I have hereto affixed my signature in the presence of two witnesses.

GEORGE G. EGGE.

Witnesses:
J. H. WATSON,
A. S. ALLEN.